US012623331B2

(12) United States Patent
Hecht

(10) Patent No.: US 12,623,331 B2
(45) Date of Patent: May 12, 2026

(54) HAND-HELD POWER TOOL

(71) Applicant: Robert Bosch GmbH, Stuttgart (DE)

(72) Inventor: Joachim Hecht, Magstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/712,569

(22) PCT Filed: Nov. 9, 2022

(86) PCT No.: PCT/EP2022/081335

§ 371 (c)(1),
(2) Date: May 22, 2024

(87) PCT Pub. No.: WO2023/094163

PCT Pub. Date: Jun. 1, 2023

(65) Prior Publication Data

US 2025/0058450 A1 Feb. 20, 2025

(30) Foreign Application Priority Data

Nov. 29, 2021 (DE) ..................... 10 2021 213 443.2

(51) Int. Cl.
*B25F 5/00* (2006.01)
*B25F 5/02* (2006.01)

(52) U.S. Cl.
CPC ................ *B25F 5/008* (2013.01); *B25F 5/02* (2013.01)

(58) Field of Classification Search
CPC .................................. B25F 5/008; B25F 5/02
See application file for complete search history.

(56) References Cited

U.S. PATENT DOCUMENTS

| | | | | |
|---|---|---|---|---|
| 3,611,046 A * | 10/1971 | Covert | H01L 25/03 361/705 |
| 2018/0370014 A1* | 12/2018 | Roehm | B25F 5/02 |
| 2019/0262971 A1* | 8/2019 | Kondo | H01M 10/6551 |
| 2025/0073883 A1* | 3/2025 | Lacher | B25F 5/008 |

FOREIGN PATENT DOCUMENTS

| | | |
|---|---|---|
| DE | 10 2009 001 371 A1 | 9/2010 |
| DE | 10 2013 200 708 A1 | 7/2014 |
| DE | 102013204985 A1 | 10/2014 |
| DE | 20 2015 005 110 U1 | 9/2015 |
| DE | 10 2016 210 853 A1 | 12/2017 |
| DE | 10 2017 211 007 A | 1/2019 |
| DE | 10 2018 122 170 A | 3/2019 |
| EP | 2 540 450 A1 | 1/2013 |

OTHER PUBLICATIONS

International Search Report corresponding to PCT Application No. PCT/EP2022/081335, mailed Feb. 20, 2023. (German and English language document). (6 pages).

* cited by examiner

*Primary Examiner* — Lucas E. A. Palmer
(74) *Attorney, Agent, or Firm* — Maginot, Moore & Beck LLP

(57) ABSTRACT

A hand-held power tool includes (i) a drive unit which can be actuated by way of at least one hand switch, (ii) a control unit at least for controlling the drive unit, wherein the control unit has a control unit circuit board and a control unit housing, and (iii) an energy-supply interface which is designed to establish a connection to an energy supply. The control unit housing has at least one cooling element which is designed to cool at least the control unit circuit board.

10 Claims, 7 Drawing Sheets

HAND-HELD POWER TOOL

This application is a 35 U.S.C. § 371 National Stage Application of PCT/EP2022/081335, filed on Nov. 9, 2022, which claims the benefit of priority to Serial No. DE 10 2021 213 443.2, filed on Nov. 29, 2021 in Germany, the disclosures of which are incorporated herein by reference in their entirety.

The present disclosure relates to a hand-held power tool.

BACKGROUND

A hand-held power tool comprising a drive unit, a housing and a control unit is already known from the prior art, in which the control unit has a control unit housing and a control unit circuit board.

SUMMARY

The present disclosure relates to a hand-held power tool including a drive unit, whereby the drive unit can be actuated by means of at least one hand switch, comprising a control unit at least for controlling the drive unit, whereby the control unit has a control unit circuit board and a control unit housing, and comprising an energy supply interface which is designed to establish a connection to an energy supply. It is proposed that the control unit housing has at least one cooling element which is designed to cool at least the control unit circuit board.

The disclosure provides a hand-held power tool that makes it possible to process higher currents through the control unit. The disclosure achieves this by way of the cooling element, which cools at least the control unit circuit board.

The invention provides a hand-held power tool that makes it possible to process higher currents through the control unit. The invention achieves this by means of the cooling element, which cools at least the control unit circuit board.

The hand-held power tool can be designed as an electrically or pneumatically operated hand-held power tool. The electrically operated hand-held power tool can in this case be designed as a grid-powered or battery-driven hand-held power tool. The hand-held power tool can, e.g., be designed as a screwdriver, a pneumatic screwdriver, a drill driver, a rotary impact screwdriver, a hammer, a hammer drill, a pneumatic rotary impact screwdriver, or an impact drill driver.

The drive unit is designed such that it can be actuated via a hand switch. When the hand switch is actuated by a user, then the drive unit is switched on and the hand-held power tool is put into operation. If the hand switch is not further actuated by the user, then the drive unit is switched off. Preferably, the drive unit can be electronically controlled and/or regulated such that reversing operation and a preset for a desired rotational speed can be realized. It is also conceivable that the hand switch is a latching hand switch that can be latched in at least one position during at least one actuation state. In reversing mode, the drive unit can be switched between clockwise and counter-clockwise rotation. To switch the drive unit in reversing mode, the hand-held power tool can have a rotation direction changeover element, in particular a rotation direction changeover switch.

The drive unit includes at least one drive motor, and in one embodiment it can comprise at least one transmission. In particular, the drive motor can be designed as at least one electric motor. The transmission can be designed as at least one planetary gear, whereby it can, for example, be shiftable. In a shiftable transmission, it is possible to switch between at least two gear stages by way of at least one gear shifting element, in particular a gear shifter. The disclosure can also be applied to other types of motors or transmissions. In addition, the hand-held power tool comprises the energy supply interface, which is designed to establish the connection to the energy supply. The energy supply interface enables a mechanical and energetic, in particular electrical, connection to the energy supply. The energy supply can, e.g., provide electrical or pneumatic energy. In this case, the energy supply is, by way of example, provided for battery operation by way of batteries, in particular hand-held power tool battery packs and/or via a power grid. In a preferred embodiment, the energy supply is designed for battery-driven operation. In the preferred embodiment, the energy supply interface is designed as a battery pack interface, in particular a hand-held power tool battery pack interface, for connection to the battery pack, in particular a hand-held power tool battery pack. In the context of the present disclosure, the expression "hand-held power tool battery pack" is understood to mean a combination of at least one battery cell and a battery pack housing. The hand-held power tool battery pack is advantageously designed for supplying energy to commonly available battery-driven hand-held power tools. The at least one battery cell can, e.g., be a Li-ion battery cell with a nominal voltage of 3.6 V. The hand-held power tool battery pack can, e.g., comprise up to ten battery cells, whereby a different number of battery cells also is conceivable. Both an embodiment as a battery-driven, hand-held power tool and operation as a grid-powered, hand-held power tool are sufficiently well-known to the skilled person, so the specifics of the energy supply will not be addressed herein.

The hand-held power tool can comprise an impact mechanism. During operation, the impact mechanism generates high torque peaks in order to free stuck connecting means or to attach connecting means. The impact mechanism can be connected to the drive motor by way of the transmission. The impact mechanism can, e.g., be designed as a rotational impact mechanism, a detent impact mechanism, a rotary impact mechanism, or a hammer impact mechanism.

The hand-held power tool can comprise a tool holder for holding an insert tool. The tool holder can be designed as an internal tool holder, e.g. a bit holder, as an external tool holder, e.g. a nut holder, or as a drill chuck. The tool holder can hold insert tools, e.g. screwdriver bits or sockets, so that a user can make screw connections between a fastening element and a fastener support.

The control unit of the hand-held power tool is at least designed to control the drive unit. The control unit, in particular the control unit circuit board, can receive switching signals that are generated by the hand switch. It is conceivable that the control unit, in particular the control unit circuit board, processes the switching signals from the hand switch before the control unit, in particular the control unit circuit board, forwards the switching signals to the drive unit for control. In addition, the control unit, in particular the control unit circuit board, is designed to receive user interface signals from a user interface, process them and output them. The control unit, in particular the control unit circuit board, processes the user interface signals into at least one output signal and outputs the signal. The output signal can then be sent to the user interface and/or control and/or regulate the drive unit. The control unit can comprise at least one microprocessor or a microcontroller. The control unit comprises the control unit circuit board, whereby the control unit circuit board can comprise at least one microprocessor or a microcontroller. The control unit in this case comprises the control unit housing and the control unit circuit board. The control unit housing in this case accommodates the control unit circuit board and arranges the control unit circuit board relative to the housing.

The hand-held power tool has a user interface comprising at least one control element. In particular, the user interface is arranged on the housing. The user interface can be an interface between the user and the hand-held power tool. The control element is designed to receive input from the user. Advantageously, the control element is used at least for setting at least one operating mode, in particular a speed level, and/or at least for controlling and/or regulating a workstation lighting unit. It is conceivable that the control element can also be configured to be assigned to set an operating mode that can be allocated by the user. Furthermore, the control element can also be used to set another operating mode that appears advantageous to the skilled person.

The hand-held power tool has a housing. The housing accommodates the drive unit and the optional impact mechanism. The housing also accommodates the control unit and the user interface, at least in part. In this context, the expression "at least partially" is understood to mean that the housing accommodates at least part of the control unit and the user interface. The housing comprises at least one holder for the control unit. In this case, the holder for the control unit at least partially surrounds the control unit housing. In this case, the holder for the control unit is, by way of example designed in the form of ribs. In this case, the ribs are, by way of example, designed to be integral with the housing. The control unit housing is designed at least for arranging the control unit in the housing. The control unit housing can be shaped in the manner of a bowl, cup, plate, or the like. The control unit circuit board comprises electronics having a plurality of electrical components, such as capacitors, resistors, ICs, processors, controllers, transistors, field-effect transistors, mosfets and the like. The control unit circuit board and the control unit housing are in this case connected to each other using a casting compound. The control unit housing can hold the casting compound. The casting compound enables a bonded connection between the control unit circuit board and the control unit housing. The casting compound can be designed to be thermally conductive, so that any heat generated by a current flow through the control unit circuit board, in particular through the electronics, can be absorbed by the casting compound and at least partially transferred to the control unit housing. In addition, the casting compound can be electrically insulating so that essentially no electrical current can flow from the control unit circuit board to the control unit housing.

The control unit housing has the cooling element. The cooling element is designed to cool at least the control unit circuit board, in particular the electronics. The cooling element can be at least partially connected to the casting compound. The heat generated can then be absorbed by the cooling element and distributed essentially evenly across the cooling element. As a result, the heat generated is able to be extracted from the control unit circuit board by means of the casting compound, thereby cooling the control unit circuit board. The cooling element is also designed to dissipate the heat generated to the surroundings so that the cooling element can continue to absorb and dissipate the heat generated.

The energy supply interface is arranged at the user interface. The energy supply interface is designed to receive the energy supply, in particular the hand-held power tool battery pack, and in particular to hold it. In addition, the energy supply interface is designed to connect the energy supply in particular the hand-held power tool battery pack, to the housing so that it can be detached without tools and to ensure the energy supply to the hand-held power tool. The energy supply interface forms at least one base along with at least one standing surface comprising a connected hand-held power tool battery pack. The hand-held power tool can in particular be stored, in particular placed, on a standing surface by means of the base. The housing also comprises a handle. The handle is designed to be grasped by the user in order to use the hand-held power tool. The energy supply interface is arranged on the handle.

In one embodiment of the hand-held power tool, the cooling element is arranged between the control unit circuit board and the energy supply interface, in particular the battery pack interface, especially the hand-held power tool battery pack interface. The casting compound can be arranged at least partially between the control unit circuit board and the cooling element. The cooling element can be arranged at a distance from the energy supply interface. It is conceivable that the cooling element is supported on the energy supply interface or that the cooling element is in contact with the energy supply interface.

In one embodiment of the hand-held power tool, the cooling element is arranged at least partially overlapping a base of the control unit housing. The base of the control unit housing can comprise holders for a plurality of electrical components on the control unit circuit board. For example, pins or plug contacts can be at least partially immersed in the holders of the control unit housing. The holders of the control unit housing can, for example, be pot-shaped, bowl-shaped, circular, elliptical or polygonal. The base of the control unit housing and the cooling element can be arranged to at least partially overlap such that the cooling element is only partially in contact with the control unit circuit board by means of the casting compound. As a result, the heat generated is able to be dissipated from the control unit circuit board without returning to the control unit circuit board. The control unit housing can then essentially serve as thermal insulation, so that the cooling element absorbs the heat generated and conducts it away from the control unit circuit board.

In one embodiment of the hand-held power tool, the cooling element at least partially forms the base of the control unit housing. Here, for example, the cooling element can form at least part or a region of the base.

In addition to the base, the control unit housing also has a rim. The rim can at least partially surround the base. For example, the base can be designed as a base plate that is essentially flat. The rim can be designed as an at least partially circumferential bar or collar. For example, the control unit housing can be made from a plastic, for example using an injection molding method. The rim can, e.g., be designed in the manner of a cup rim, a pot rim, or a bowl wall.

In one embodiment, the cooling element at least partially forms the rim of the control unit housing. The cooling element can then dissipate via the rim the heat generated to the surroundings via the casting compound.

In one embodiment of the hand-held power tool, the cooling element is designed as a cooling plate. The cooling plate can, for example, be essentially flat and essentially level. The cooling plate can be made of a thermally conductive material, such as a metal, in particular aluminum.

In one embodiment of the hand-held power tool the cooling element has at least one heat absorption element, which is designed to absorb at least heat from at least one power component of the control unit circuit board. The cooling element and the heat absorption element can be connected to each other in an interlocking, frictional, or bonded manner. It is also possible for the cooling element and the heat absorption element to be one piece. The heat absorption element can be made of a thermally conductive material, such as a metal, in particular aluminum. It is possible for the heat absorption element to be produced by stamping or embossing into the cooling element. The heat absorption element is designed to absorb heat from the power component of the control unit circuit board, in particular the electronics, and transfer it to the cooling element. The power component of the control unit circuit board can, for example, be at least one mosfet, at least one transistor or at least one IC. It is conceivable that a plurality of heat absorption elements are provided, such as two, three, four or more than four, depending on how many power components are arranged on the control unit circuit board. The heat absorption element can, for example, take the form of a bulge, a bowl, a cup, a collar, a web or a projection. The heat absorption element can, for example, be I-shaped, U-shaped, L-shaped, T-shaped or similar. Here, the heat absorption element has a small distance in the range of 0.4 mm to 2 mm from the power component, so that the small distance is still large enough for the casting compound to flow between the heat absorption element and the power component. The casting compound is then designed to conduct the heat generated from the power component to the heat absorption element.

In one embodiment of the hand-held power tool, the control unit housing has at least one heat conduction opening which is designed to conduct heat from the control unit circuit board to the cooling element. The heat conduction opening can be circular, elliptical, triangular, square or polygonal, for example. It is conceivable that a plurality of heat conduction openings are provided. The heat conduction opening can be arranged in the base of the control unit housing. In addition, the heat conduction opening can be arranged between the control unit circuit board and the cooling element. The heat absorption element can, for example, be arranged essentially in the heat conduction opening. It is also possible for the heat absorption element to protrude into the heat conduction opening.

In one embodiment of the hand-held power tool, the cooling element has an electrically insulating coating, at least in part. The coating can be used to provide electrical insulation to the energy supply interface. The coating can be arranged between the cooling element and the energy supply interface. The coating can be anodized, for example. The coating makes it possible to essentially prevent possible voltage peaks and/or possible unwanted current flows between the energy supply interface and the control unit, in particular the control unit circuit board.

In one embodiment of the hand-held power tool, the control unit housing is at least partially overmolded around the cooling element, in particular by means of an injection molding method. The control unit housing can at least partially enclose the cooling element. The base of the control unit housing can be at least partially overmolded around the cooling element using the injection molding method such that the base of the control unit housing and at least one region of the cooling element form an overall base.

In one embodiment of the hand-held power tool, the control unit housing has at least one frame-like holding element, which is designed to at least partially hold the cooling element. The holding element can at least partially surround the cooling element. The holding element can thus form at least a bonded connection with the cooling element. The holding element can be connected to the control unit housing in an interlocking, frictional, or bonded manner. It is possible for the control unit housing to form the holding element so that the holding element and the control unit housing are one piece. The holding element can be designed in the manner of a frame.

In one embodiment of the hand-held power tool, the cooling element has at least one coupling element and the control unit housing has at least one connecting element, whereby the coupling element is designed to hold the connecting element. The coupling element of the cooling element can, e.g., be designed in the manner of a dome, a projection, or a bulge. It is possible for a plurality of coupling elements to be provided, such as two, three, four or more than four. The coupling element can be arranged on a rim region of the cooling element, for example. The control unit housing can be connected to the connecting element in an interlocking, frictional, or bonded manner. It is possible for the control unit housing to form the connecting element so that they are in one piece. The connecting element can be designed in the manner of a pin, a bar, an edge, or a projection. It is possible that a plurality of connecting elements is provided, such as two, three, four or more than four. A number of coupling elements corresponds to a number of connecting elements. The connecting element is designed such that it can engage in the coupling element. The connecting element and the coupling element enable the cooling element to be secured, in particular axially and/or radially, relative to the control unit housing.

The control unit housing has the rim, the base, the heat conduction opening, the holding element and the connecting element. The control unit housing can be manufactured using the injection molding method so that the rim, the base, the heat conduction opening, the holding element and the connecting element are in one piece.

The cooling element has the heat absorption element and the coupling element. The cooling element can form the heat absorption element and the coupling element.

In an alternative embodiment, the cooling element is screwed to the control unit housing. It is also conceivable that the cooling element is glued to the control unit housing, connected to each other by means of a snap connection or connected to each other by means of snap-in hooks.

BRIEF DESCRIPTION OF THE DRAWINGS

The disclosure is explained in more detail in the following with reference to a preferred embodiment. The drawings hereinafter show.

DETAILED DESCRIPTION

Figure 1:
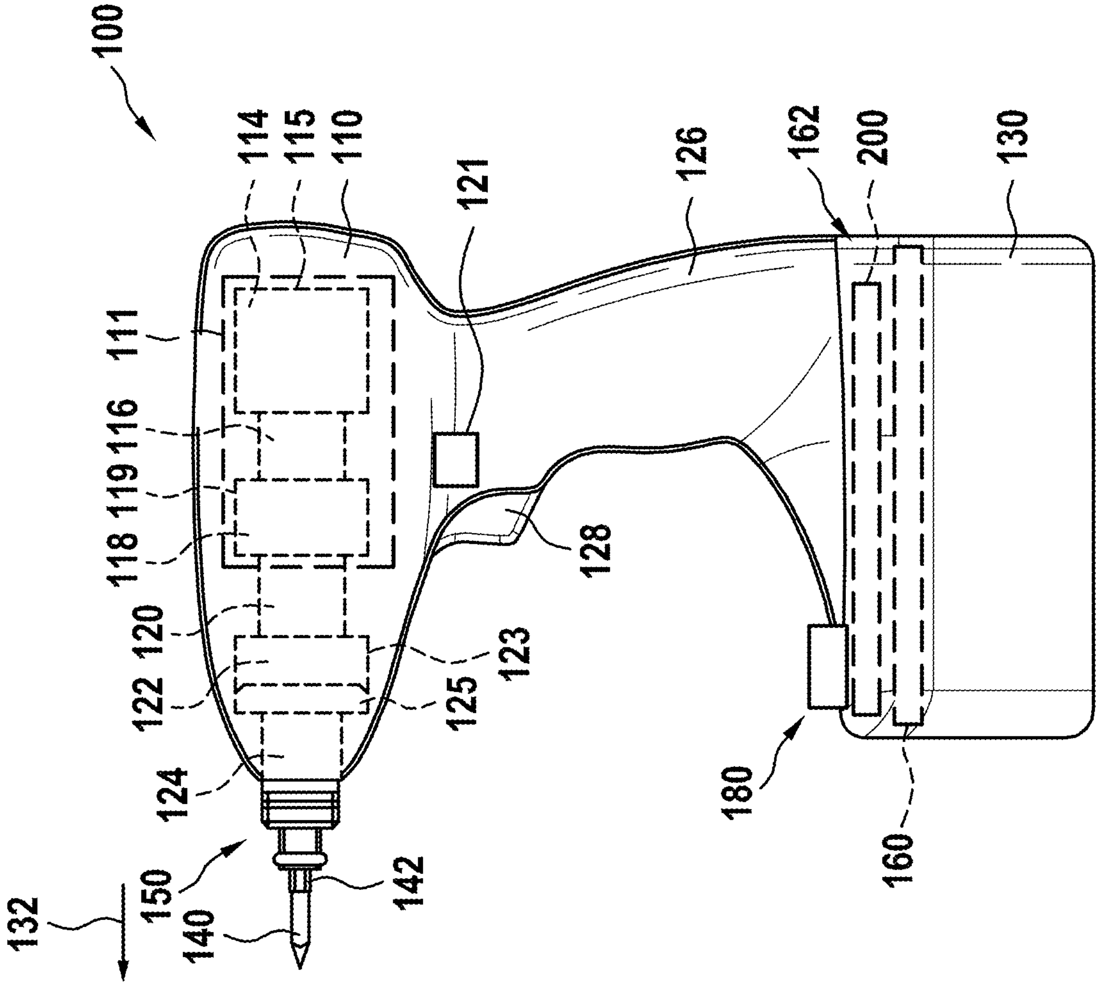
FIG. 1 a schematic view of a hand-held power tool according to the disclosure comprising a control unit.

FIG. 1 shows a hand-held power tool 100 according to the disclosure, said tool in this case being designed as, e.g., a cordless rotary impact screwdriver. The hand-held power tool 100 comprises an output shaft 124, a tool holder 150, and an exemplary impact mechanism 122, such as a rotary or rotational impact mechanism. The hand-held power tool 100 comprises a housing 110 with a handle 126. Given a grid-independent current supply, the hand-held power tool 100 can be mechanically and electrically connected to an energy supply for battery operation, so the hand-held power tool 100 is designed as a battery-driven, hand-held power tool 100. A hand-held power tool battery pack 130 is in this case used as the energy supply. The present disclosure is not limited to battery-driven hand-held power tools, however, but can also be used for grid-dependent, i.e., grid-powered, hand-held power tools or pneumatically operated hand-held power tools.

The housing 110 illustratively comprises a drive unit 111 and the impact mechanism 122. The drive unit 111 further comprises an electric drive motor 114, which is supplied with current by the hand-held power tool battery pack 130, and a transmission 118. The transmission 118 can be designed as at least one planetary gear. The drive motor 114 is designed such that it can be actuated, e.g. via a hand switch 128, so that the drive motor 114 can be switched on and off. The drive motor 114 can be any type of motor, e.g. an electronically commutated motor, a brush motor, a DC motor, or an AC motor. The drive motor 114 can advantageously be electronically controlled and/or regulated so that a reversing mode and a desired rotational speed can be implemented. For the reversing mode, the hand-held power tool 100 comprises a rotation direction changeover element 121 designed as a rotation direction changeover switch. The rotation direction changeover element 121 is designed to switch the drive motor 114 between a clockwise direction of rotation and a counterclockwise direction of rotation. The design and mode of operation of a suitable drive motor are well known to the skilled person, for which reason they will not be described in greater detail herein.

The transmission 118 is connected to the drive motor 114 via a motor shaft 116. The transmission 118 is provided to convert a rotation of the motor shaft 116 into a rotation between the transmission 118 and the impact mechanism 122 via a drive member 120, for example a drive shaft. Preferably, this conversion takes place such that the drive member 120 rotates relative to the motor shaft 116 with increased torque, but at a reduced rotational speed. A motor housing 115 is, by way of illustration, associated with the drive motor 114. Similarly, a transmission housing 119 is associated with the transmission 118. Both the motor housing 115 and the transmission housing 119 are, by way of example, arranged inside the housing 110. However, it is also conceivable that the drive motor 114 and the transmission 118 can be arranged directly in the housing 110 if the hand-held power tool 100 is designed in an “open frame” design.

The impact mechanism 122 is connected to the drive member 120 and comprises, by way of example, an impact body 125, which generates impact-like rotary pulses at a high intensity. These impact-like rotary pulses are transmitted to the output shaft 124, for example a work spindle, via the impact body 125. The impact mechanism 122 comprises an impact mechanism housing 123, whereby the impact mechanism 122 can also be arranged in another suitable housing, such as the transmission housing 119. The example impact mechanism 122 is designed to drive the output shaft 124. A tool holder 150 is provided on the output shaft 124. The tool holder 150 is preferably molded and/or formed on the pinion shaft 124. The tool holder 150 is preferably arranged in an axial direction 132 facing away from the drive unit 111. The tool holder 150 is in this case designed as a hexagon socket (in the manner of a bit holder), which is intended to hold an insertion tool 140. The insertion tool is designed in the manner of a screwdriver bit having a polygonal outer coupling 142. The type of the screwdriver bit, e.g. a HEX type, is sufficiently well-known to the skilled person. However, the present disclosure is not limited to the use of HEX screwdriver bits. Other tool holders that appear advantageous to the skilled person, e.g. HEX drills, SDS quick-insert tools, or round-shank drill chucks, can be used as well. In addition, the design and function of a suitable bit holder are well known to the skilled person.

The hand-held power tool 100 comprises the housing 110, a control unit 200 at least for controlling the drive unit 111, and a user interface 180 comprising a control element (not shown in detail). The control element can receive input from a user The housing 110 at least partially accommodates the control unit 200 and the user interface 180. The control unit 200 has a control unit circuit board 220 and a control unit housing 240 (see also FIGS. 2 to 4). The control unit housing 240 accommodates the control unit circuit board 220. In addition, the control unit housing 240 comprises a cooling element 260, which is designed to cool at least the control unit circuit board 220 (see also FIGS. 2 to 4).

The control unit 200 receives switching signals that are generated using the hand switch 128. The control unit 200 furthermore processes the switching signals of the hand switch 128 before the control unit 200 forwards the switching signals to the drive unit 111. The control unit 200 also receives user interface signals from the user interface 180. The user interface signals are generated by the user’s inputs via the control element. The control unit 200 processes the user interface signals to at least one output signal and outputs said signal. The output signal is sent to the user interface 180 and/or the drive unit 111.

In addition, the housing 110 comprises an energy supply interface 160. In this case, the energy supply interface 160 is, by way of example, designed as a hand-held power tool battery pack interface (see also FIG. 2). Furthermore, the control unit 200 and the user interface 180 are arranged at the energy supply interface 160 (see also FIG. 2). The energy supply interface 160 accommodates the hand-held power tool battery pack 130, forming a base 162 with a standing surface. The hand-held power tool battery pack 130 can be detached from the energy supply interface 160 without tools. The housing 110 also has the handle 126 and the energy supply interface 160. The handle 126 can be grasped by the user. In one embodiment, the energy supply interface 160 is arranged on the handle 126. The hand-held power tool 100 can be set down on the standing surface 162.

Figure 2A:
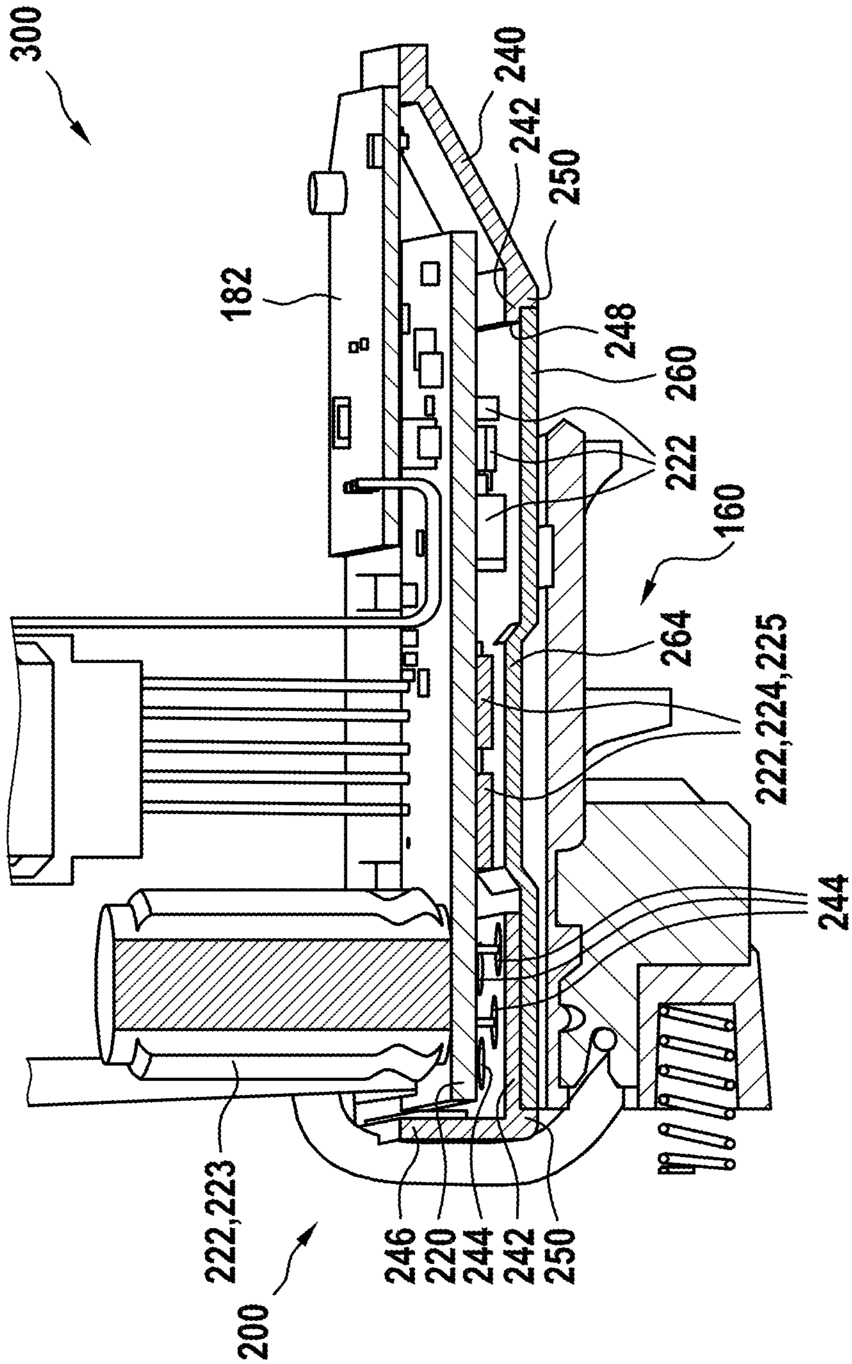
FIG. 2*a* a longitudinal sectional view of the control unit comprising a cooling element.

FIG. 2 shows two sectional views 300, 310 of the control unit 200 comprising the cooling element 260, see FIG. 2*a*, *b*. The user interface 180 has a user interface circuit board 182 that is electrically connected to the control unit circuit board 220. In this case, the control unit housing 240 is, by way of example, designed in the manner of a bowl. In this case, the control unit circuit board 220 comprises electronics with a plurality of electrical components 222, such as capacitors 223, mosfets 224, resistors (not shown in detail), ICs, processors, controllers, transistors, field-effect transistors, and the like. The control unit circuit board 220 and the control unit housing 240 are connected to one another in a bonded manner by means of a thermally conductive and electrically insulating casting compound. For a better overview, the casting compound is not shown in this case. The control unit housing 240 holds the casting compound. The casting compound at least partially encloses the control unit circuit board 220. In addition, the casting compound is arranged between the control unit circuit board 220 and the control unit housing 240. Here, the cooling element 260 is partially connected to the casting compound. Operating the electronics of the control unit circuit board 220 generates heat. The heat generated is absorbed by the cooling element 260 and distributed essentially evenly via the cooling element 260. The casting compound conducts the heat generated from the control unit circuit board 220 to the cooling element 260. The cooling element 260 is shaped as an essentially planar and essentially flat cooling plate. The cooling plate can be made of a thermally conductive material such as a metal, in particular aluminum. The cooling element 260 partially comprises an electrically insulating coating (not shown in detail). The coating is designed to provide electrical insulation to the energy supply interface 160, the coating being arranged between the cooling element 260 and the energy supply interface 160. In this case, the coating is, e.g., an anodized finish.

The cooling element 260 is arranged between the control unit circuit board 220 and the energy supply interface 160, whereby the casting compound is partially arranged between the control unit circuit board 220 and the cooling element 260. The cooling element 260 is arranged at a distance from the energy supply interface 180. In addition, the cooling element 260 is arranged partially overlapping with a base 242 of the control unit housing 240 (see also FIG. 3). The base 242 of the control unit housing 240 comprises cup-like holders 244 for the plurality of electrical components 222 of the control unit circuit board 220. For example, pins or plug-in contacts of the electrical components 222 can be partially immersed in the holders 244 of the control unit housing 240. The cooling element 260 in this case partially forms the base 242 of the control unit housing 240. In this case, the holders 244 are formed directly in the control unit housing 240. In addition to the base 242, the control unit housing 240 comprises a rim 246, whereby the rim 246 surrounds the base 242 (see also FIGS. 3 and 4). In this case, the base 242 is, by way of example, designed as an essentially flat base plate. The rim 246 is exemplarily formed as a partially circumferential web. Here, the control unit housing 240 is made from a plastic using an injection molding method. In addition, the control unit housing 240 is overmolded around the cooling element 260 using the injection molding method. The control unit housing 240 thus partially encloses the cooling element 260. The base 242 of the control unit housing 240 is overmolded around the cooling element 260 by the injection molding method such that the base 242 of the control unit housing 240 and a region of the cooling element 260 form an overall base.

The cooling element 260 comprises three heat absorption elements 262, 263, 264 made of a thermally conductive material (see also FIGS. 3 and 4). The heat absorption elements 262, 263, 264 are designed to absorb the heat generated by at least one power component 225, such as the mosfets 224 of the control unit circuit board 220. The cooling element 260 forms the heat absorption element 262, 263, 264, so that these are in one piece. The heat absorption elements 262, 263, 264 are each formed as a bulge, whereby two of the heat absorption elements 262, 263 are I-shaped and one of the heat absorption elements 264 is L-shaped. The heat absorption elements 262, 263, 264 have a small distance in the range of 0.4 mm to 2 mm from the power components 224. However, the small distance is large enough so that the casting compound can flow between the heat absorption elements 262, 263, 264 and the power components 225.

The control unit housing 240 comprises a polygonal heat conduction opening 248 (see also FIGS. 3 and 4). The heat conduction opening 248 enables the heat generated to be conducted from the control unit circuit board 240 to the cooling element 260. Here, the base 242 of the control unit housing 240 forms the heat conduction opening. The heat conduction opening 248 is arranged between the control unit circuit board 220 and the cooling element 260. The heat absorption elements 262, 263, 264 protrude into the heat conduction opening 248. In addition, the control unit housing 240 comprises a frame-like holding element 250 (see also FIGS. 3 and 4). The holding element 250 is designed to hold and partially embrace the cooling element 260.

Figure 2B:
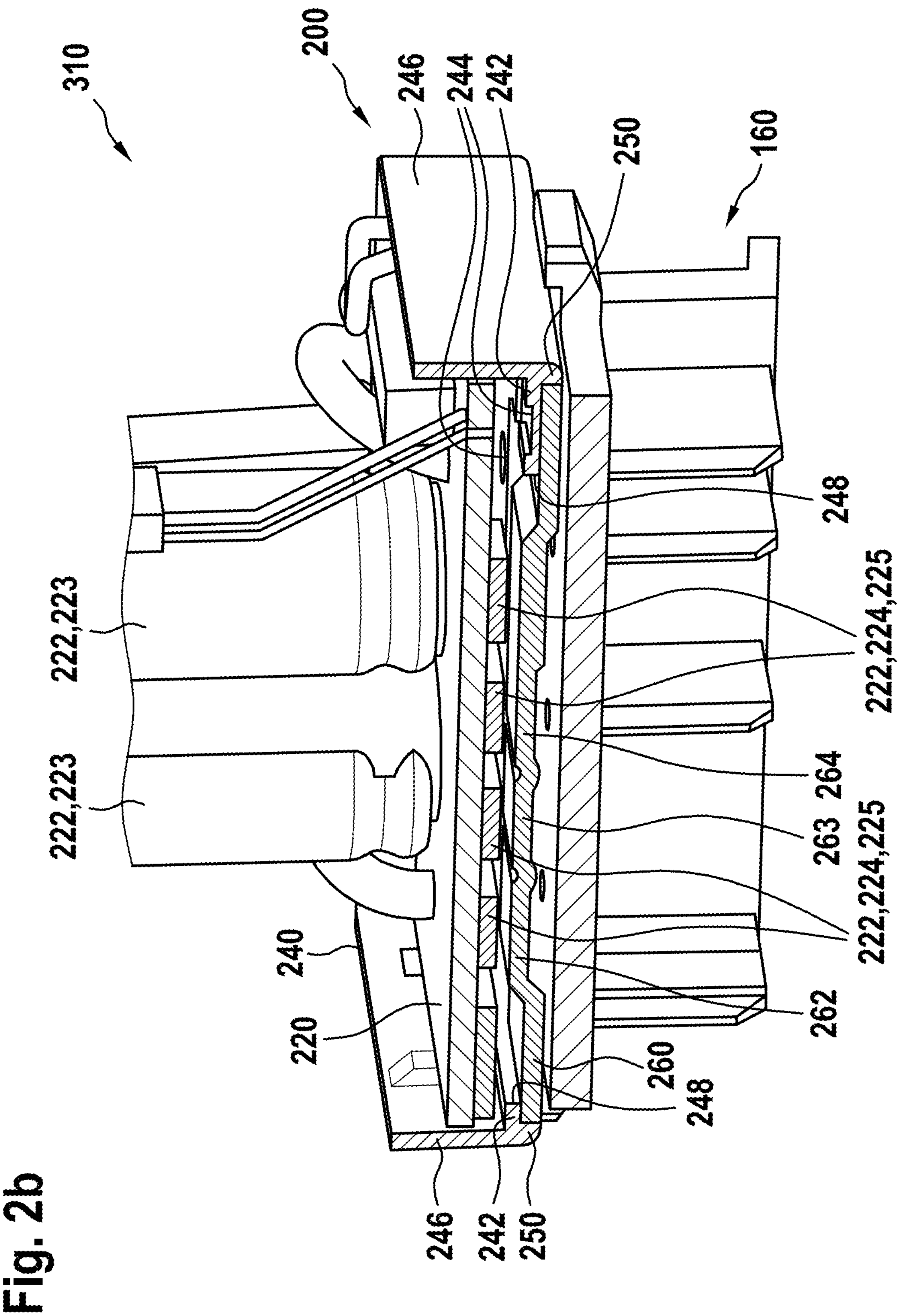
FIG. 2*b* a cross-sectional view of the control unit comprising the cooling element.

FIG. 2*a* shows a longitudinal sectional view 300 of the control unit 200 comprising the cooling element 260. FIG. 2*b* shows a cross-sectional view 310 of the control unit 200 comprising the cooling element 260.

Figure 3A:
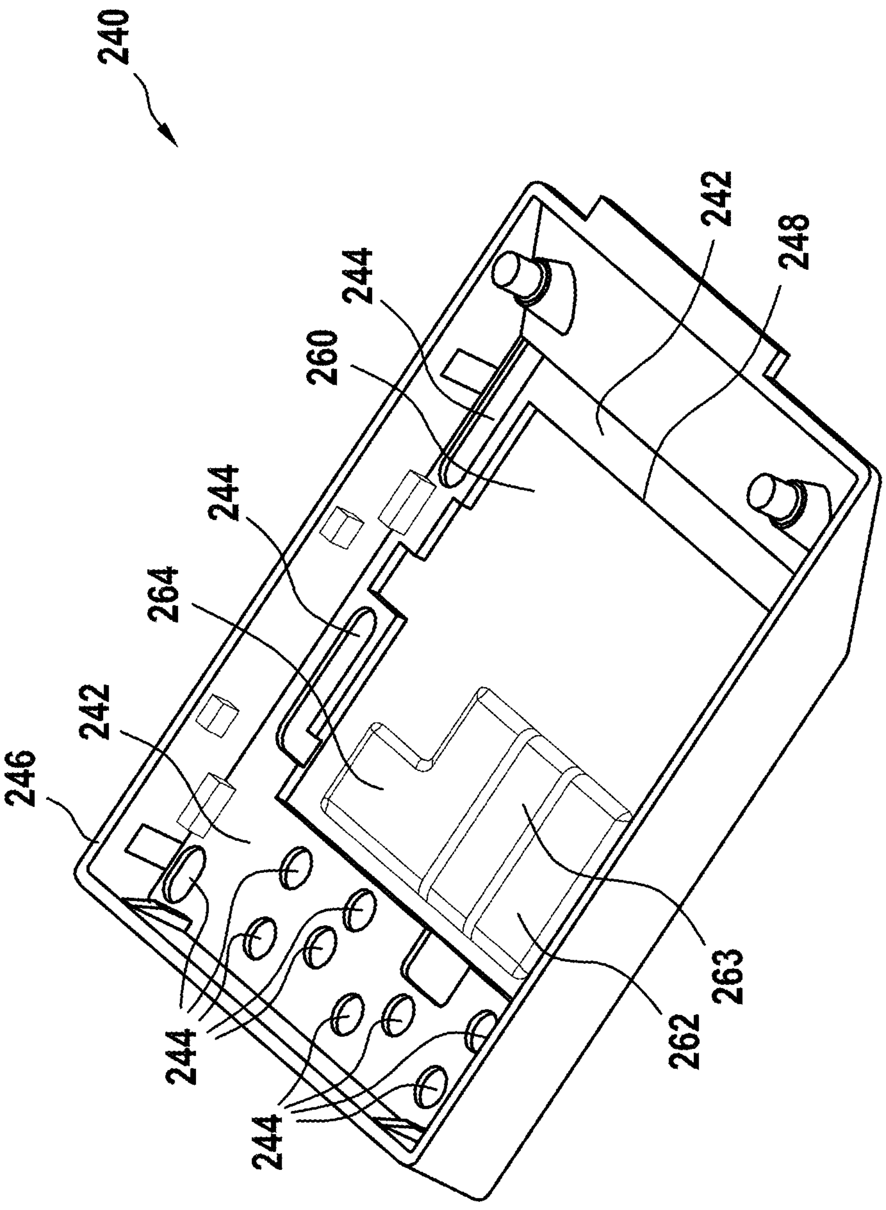
FIG. 3*a* a perspective overhead view of a control unit housing comprising the cooling element.
Figure 3B:
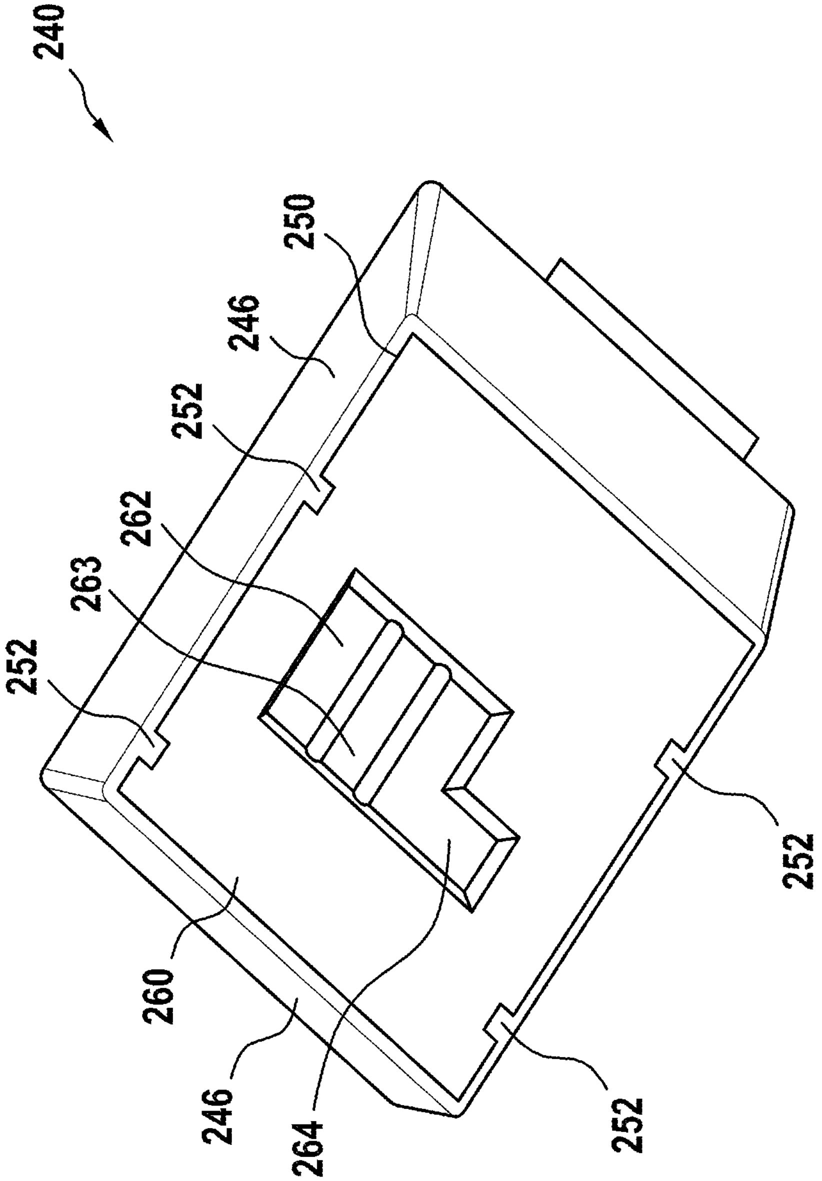
FIG. 3*b* a perspective bottom view of the control unit housing comprising the cooling element.

FIG. 3*a* shows a perspective top view of the control unit housing 240 comprising the cooling element 260. FIG. 3*b* shows a perspective bottom view of the control unit housing 240 comprising the cooling element 260. The cooling element 260 comprises four coupling elements 266 (see also FIG. 4*b*). The control unit housing 240 comprises four connecting elements 252 (see also FIG. 4*a*). The coupling element 266 is designed to hold the connecting element 252. The connecting elements 252 engage with the coupling elements 266.

Figure 4A:
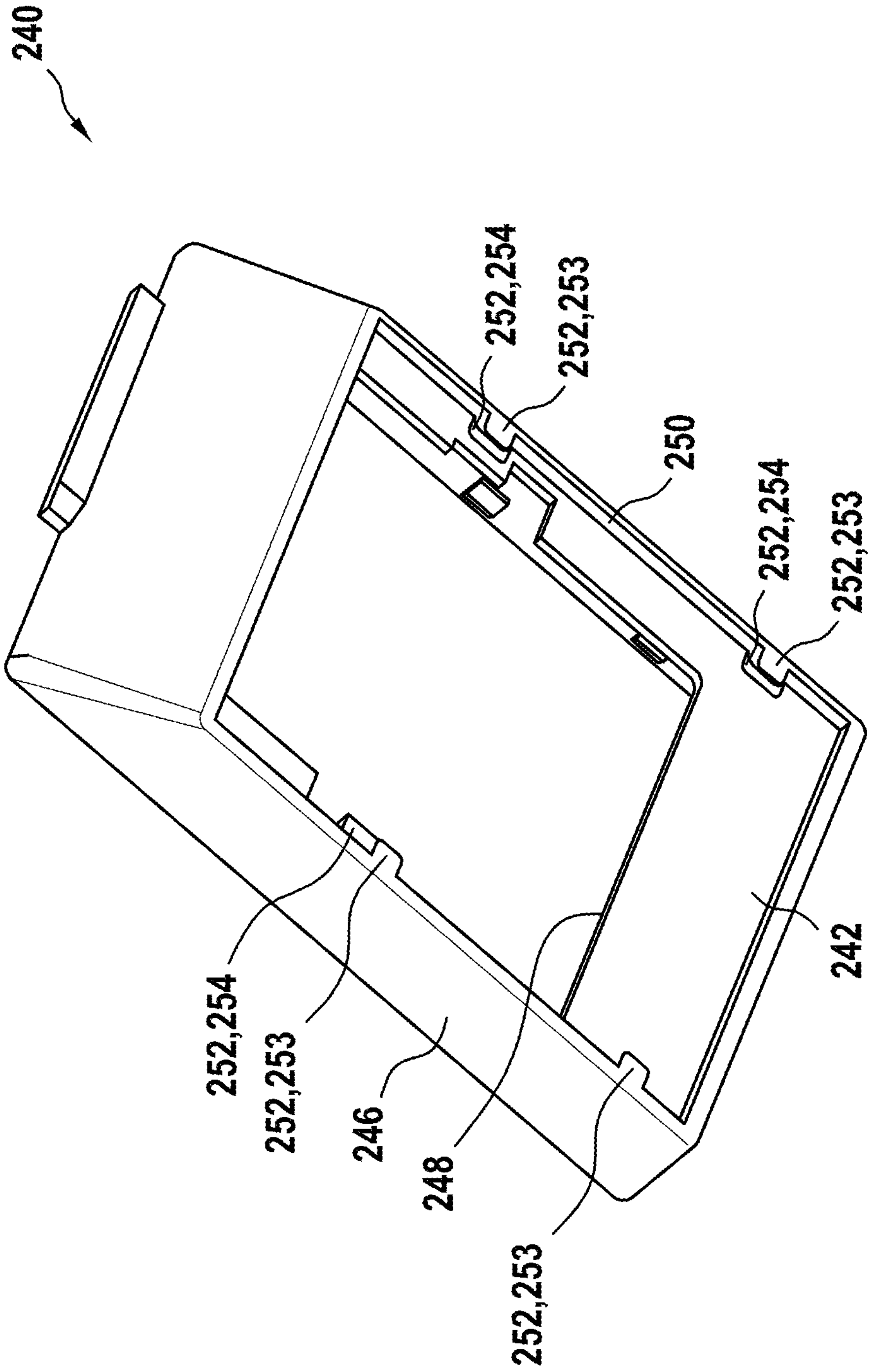
FIG. 4*a* a perspective bottom view of the control unit housing.

FIG. 4*a* shows a perspective bottom view of the control unit housing 240. The control unit housing 240 comprises the rim 246, the base 242, the heat conduction opening 248, the holding element 250 and the connecting elements 252, whereby the control unit housing 240 forms these. The control unit housing 240 forms the connecting elements 252 in an integral manner. The connecting elements 252 each comprise a connecting pin 253 and a connecting bowl 254. The connecting pins 253 and the connecting bowls 254 are designed such that they can each hold one of the coupling elements 266. The coupling element 266 is then arranged between the connecting bowl 254 and the connecting pin 253.

Figure 4B:
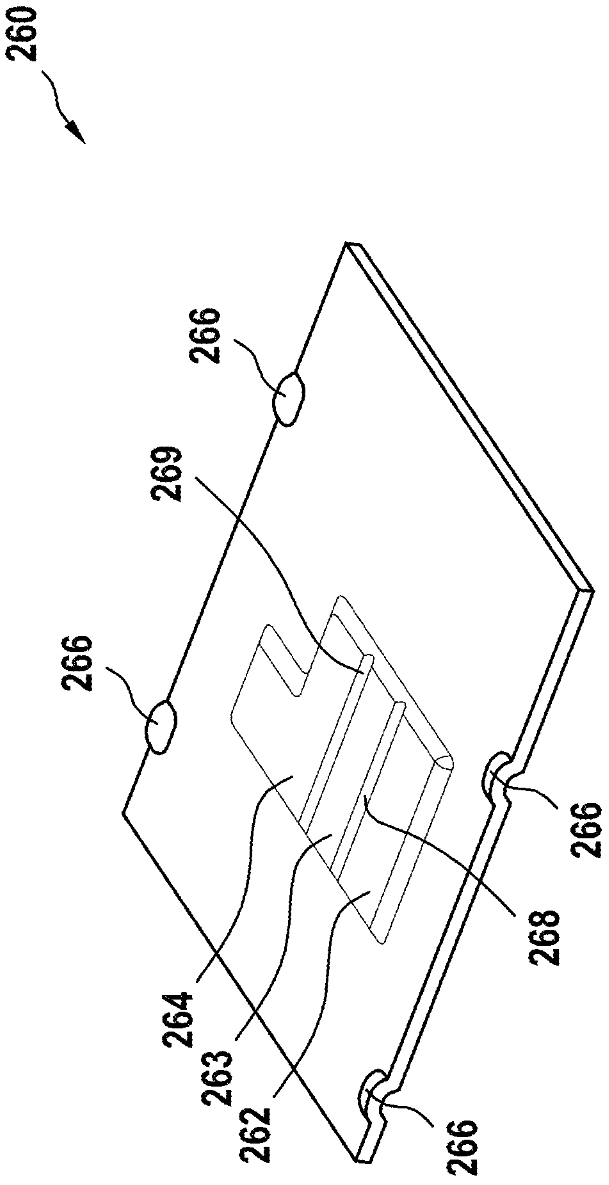
FIG. 4*b* a perspective view of the cooling element.

FIG. 4*b* shows a perspective view of the cooling element 260. The coupling elements 266 of the cooling element 260 are, by way of example, shaped in a dome-like manner on a rim region of the cooling element 260. The heat absorption elements 262, 263, 264 are partially spaced apart by means of grooves 268, 269. The cooling element comprises and forms the heat absorption elements 262, 263, 264 and the coupling element 266.

The invention claimed is:

1. A hand-held power tool, comprising:

a drive unit configured to be actuated by way of at least one hand switch;

a control unit configured to at least control the drive unit, wherein the control unit has a control unit circuit board and a control unit housing; and an energy-supply interface which is designed to establish a connection to an energy supply, wherein the control unit housing has at least one cooling element which is designed to cool at least the control unit circuit board, and wherein the cooling element is interposed between the control unit circuit board and the energy supply interface.

2. The hand-held power tool according to claim 1, wherein the cooling element is arranged at least partially overlapping a base of the control unit housing.

3. The hand-held power tool according to claim 1, wherein the cooling element at least partially forms a base of the control unit housing.

4. The hand-held power tool according to claim 1, wherein the cooling element is designed as a cooling plate.

5. The hand-held power tool according to claim 1, wherein the cooling element has at least one heat absorption element which is designed to absorb at least heat from at least one power component of the control unit circuit board.

6. The hand-held power tool according to claim 1, wherein the control unit housing has at least one heat conduction opening which is designed to conduct heat from the control unit circuit board to the cooling element.

7. The hand-held power tool according to claim 1, wherein the cooling element at least partially comprises an electrically insulating coating.

8. The hand-held power tool according to claim 1, wherein the control unit housing is at least partially over-molded around the cooling element by way of an injection molding method.

9. The hand-held power tool according to claim 1, wherein the control unit housing has at least one frame-like holding element which is designed to at least partially hold the cooling element.

10. The hand-held power tool according to claim 1, wherein:

the cooling element has at least one coupling element, the control unit housing has at least one connecting element, and the coupling element is designed to hold the connecting element.

* * * * *